United States Patent
Suto et al.

(10) Patent No.: US 12,459,463 B2
(45) Date of Patent: Nov. 4, 2025

(54) AUTHENTICATION SYSTEM, IN-VEHICLE AUTHENTICATION SYSTEM, AND AUTHENTICATION METHOD

(71) Applicants: ALPS ALPINE CO., LTD., Tokyo (JP); HONDA MOTOR CO., LTD., Tokyo (JP)

(72) Inventors: Daichi Suto, Miyagi (JP); Takehiro Iwabuchi, Miyagi (JP); Akira Miyazawa, Miyagi (JP); Masashi Sato, Tokyo (JP)

(73) Assignees: ALPS ALPINE CO., LTD., Tokyo (JP); HONDA MOTOR CO., LTD., Tokyo (JP)

( * ) Notice: Subject to any disclaimer, the term of this patent is extended or adjusted under 35 U.S.C. 154(b) by 260 days.

(21) Appl. No.: 18/321,215

(22) Filed: May 22, 2023

(65) Prior Publication Data
US 2023/0413044 A1 Dec. 21, 2023

(30) Foreign Application Priority Data
Jun. 17, 2022 (JP) .................................. 2022-098458

(51) Int. Cl.
*B60R 25/24* (2013.01)
(52) U.S. Cl.
CPC .................... *B60R 25/24* (2013.01)
(58) Field of Classification Search
CPC .... B60R 25/24; H04W 12/06; H04W 12/041; H04W 4/40; G07C 9/00309
See application file for complete search history.

(56) References Cited

U.S. PATENT DOCUMENTS

| 10,328,900 B1* | 6/2019 | Yakovenko | B60R 25/24 |
| 2012/0092129 A1* | 4/2012 | Lickfelt | B60R 25/24 |
| | | | 340/5.72 |
| 2021/0076203 A1* | 3/2021 | Sakamoto | H04W 4/40 |

FOREIGN PATENT DOCUMENTS

WO  2020/090507  5/2020

* cited by examiner

*Primary Examiner* — Vernal U Brown
(74) *Attorney, Agent, or Firm* — IPUSA, PLLC (57) ABSTRACT

An authentication system includes: a first communication device including: a first transmitting part configured to communicate in a first frequency band; and a first transmitting-and-receiving part configured to communicate in a second frequency band; and a second communication device including: a first receiving part configured to communicate in the first frequency band; and a second transmitting-and-receiving part configured to communicate in the second frequency band, and, in this authentication system, the first communication device transmits a command in the first frequency band from the first transmitting part, and, upon receipt of the command by the first receiving part, the second communication device activates the second transmitting-and-receiving part, generates an authentication key for a response signal, and transmits the response signal including the generated authentication key in the second frequency band, from the second communication device.

7 Claims, 5 Drawing Sheets

AUTHENTICATION SYSTEM, IN-VEHICLE AUTHENTICATION SYSTEM, AND AUTHENTICATION METHOD

CROSS-REFERENCE TO RELATED APPLICATION

This application claims priority under 35 U.S.C. § 119 to Japanese Patent Application No. 2022-098458, filed Jun. 17, 2022, the contents of which are incorporated herein by reference in their entirety.

BACKGROUND OF THE INVENTION

1. Field of the Invention

The present disclosure relates to an authentication system, an in-vehicle authentication system, and an authentication method.

2. Description of the Related Art

Conventionally, there is a first communication device that performs transmission and reception with a second communication device. The first communication device has a first transmitting/receiving circuit and a second transmitting/receiving circuit. The first transmitting/receiving circuit transmits/receives to/from the second communication device a determination signal that is used to determine the position of the second communication device. The second transmitting/receiving circuit transmits to and receives from the second communication device a distance measurement signal that is used to measure the distance to the second communication device. The distance measurement signal is transmitted before transmission of the determination signal. "Before transmission of the determination signal" here includes "at the same time as transmission of the determination signal" (see Patent Document 1, for example).

RELATED-ART DOCUMENTS

Patent Document

[Patent Document 1] International Publication No. WO2020/090507

SUMMARY

Now, although the above conventional system including the first communication device and the second communication device is designed so as to transmit the distance measurement signal before the determination signal is transmitted, no specific effort is made to ensure that, after the first communication device transmits a WAKEUP signal (command) in an LF band to activate the second communication device in sleep mode, the second communication device promptly transmits a response signal including an authentication key to the first communication device. Therefore, the above conventional system including the first communication device and the second communication device cannot shorten the response time to user operations.

Accordingly, it is an object of the present invention to provide an authentication system, an in-vehicle authentication system, and an authentication method, whereby the response time to user operations can be shortened.

The authentication system according to an embodiment of the present disclosure includes: a first communication device including: a first transmitting part configured to communicate in a first frequency band; and a first transmitting/receiving part configured to communicate in a second frequency band; and a second communication device including: a first receiving part configured to communicate in the first frequency band; and a second transmitting/receiving part configured to communicate in the second frequency band, and, in this authentication system, the first communication device transmits a command in the first frequency band from the first transmitting part, and, upon receipt of the command by the first receiving part, the second communication device activates the second transmitting/receiving part, generates an authentication key for a response signal, and transmits the response signal including the generated authentication key in the second frequency band, from the second communication device.

It is therefore possible to provide an authentication system, an in-vehicle authentication system, and an authentication method, whereby the response time to user operations can be shortened.

DESCRIPTION OF EMBODIMENTS

Now, embodiments to which the authentication system, in-vehicle authentication system, and authentication method of the present disclosure are applied will be described below.

EMBODIMENTS

Figure 1:
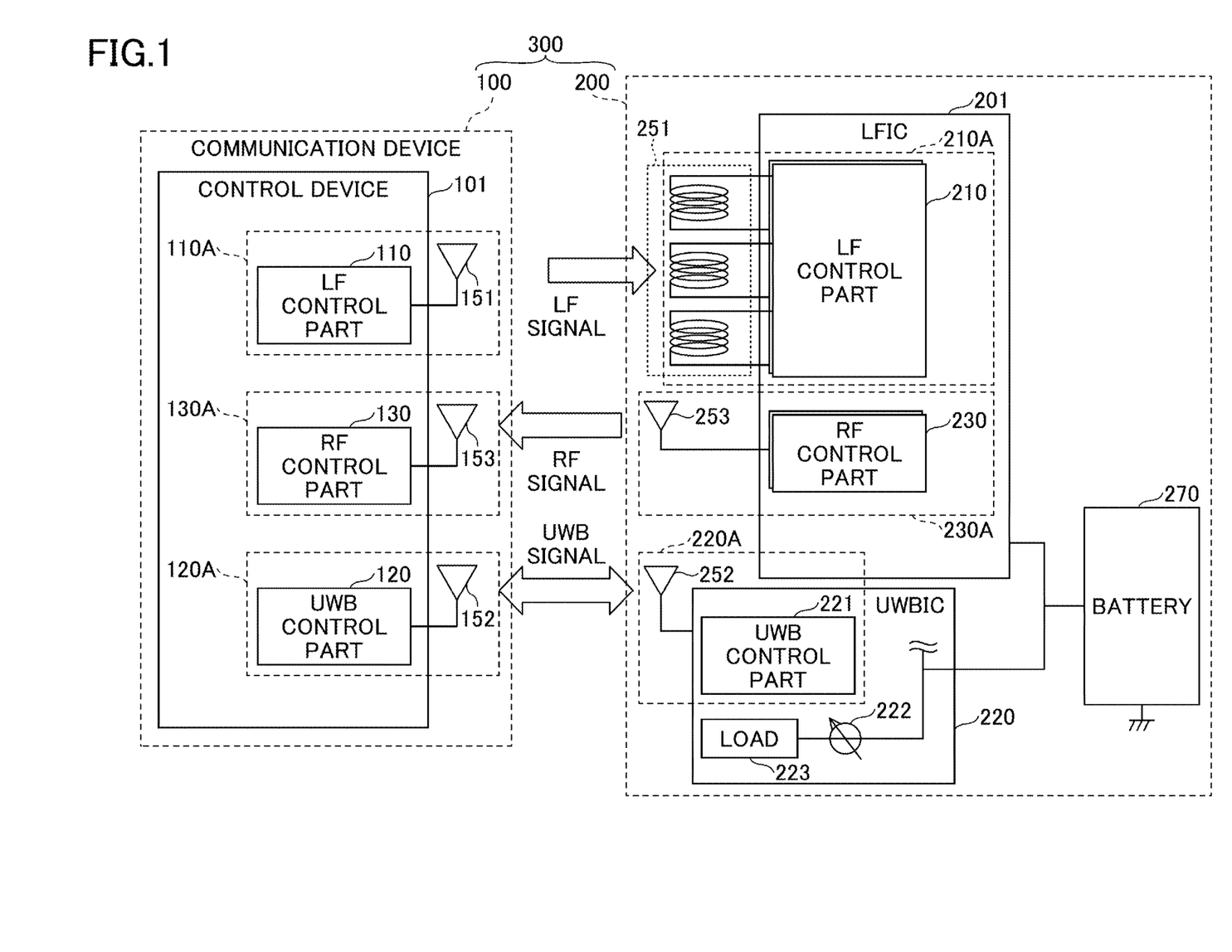
FIG. 1 is a diagram that illustrates an in-vehicle authentication system according to an embodiment.

FIG. 1 is a diagram that illustrates an in-vehicle authentication system 300 according to an embodiment. The in-vehicle authentication system 300 is obtained by applying the authentication system of the embodiment to a vehicle, and is an example of the authentication system of the embodiment. Also, the in-vehicle authentication system 300 executes the authentication method according to an embodiment.

<Structure of In-Vehicle Authentication System 300>

The in-vehicle authentication system 300 includes a communication device 100 and a key fob 200, and implements a smart entry system for a vehicle. The communication device 100 is an example of a first communication device and an example of in-vehicle equipment, and is mounted on a vehicle. The key fob 200 is an example of a second communication device and an example of a mobile device. There are actually a plurality of key fobs 200 for one communication device 100, but only one is shown in FIG. 1.

<Structure of Communication Device 100>

The communication device 100 is a vehicle ECU (Electronic Control Unit), and includes a control device (Micro Controller) 101, an LF (Low Frequency) antenna 151, a UWB (Ultra Wide Band) antenna 152, and an RF (Radio Frequency) antenna 153. The control device 101 is implemented by a computer including a CPU (Central Processing Unit), a RAM (Random Access Memory), a ROM (Read Only Memory), an input/output interface, an internal bus, and so forth. Although one control device 101 is shown in FIG. 1, the control device 101 may be a set of a number of control devices that are physically separate.

The control device 101 has an LF control part 110, a UWB control part 120, and an RF control part 130. The LF control part 110 and the LF antenna 151 constitute an LF transmitting part 110A. The LF transmitting part 110A is an example of a first transmitting part that communicates in an LF band, which is an example of a first frequency band. The UWB control part 120 and the UWB antenna 152 constitute a UWB anchor 120A. The UWB anchor 120A is an example of a first transmitting/receiving part that communicates in a UWB band, which is an example of a second frequency band. The RF control part 130 and the RF antenna 153 constitute an RF receiving part 130A. The RF receiving part 130A is an example of a second receiving part that communicates in an RF band, which is an example of a third frequency band.

The LF control part 110, the UWB control part 120, and the RF control part 130 control communication in 2' the LF transmitting part 110A, the UWB anchor 120A, and the RF receiving part 130A, respectively. Note that a plurality of LF transmitting parts 110A and UWB anchors 120A are provided in the vehicle. Details of the communication control will be described later with reference to FIG. 3 and FIG. 4.

The LF antenna 151, the UWB antenna 152, and the RF antenna 153 are antennas optimized for communication in the LF band, the UWB band, and the RF band, respectively. For example, the LF band ranges from 20 kHz to 25 kHz or from 120 kHz to 135 kHz, and 125 kHz is shown here as an example. The UWB band ranges from 2 GHz to 10 GHz, and 8 GHz is shown here as an example. The RF band ranges from 300 MHz to 3 GHz, and 315 MHz is shown here as an example.

<Structure of Key Fob 200>

The key fob 200 is a smart key that the user of the vehicle carries with him/her. The key fob 200 may be a smart key provided with the vehicle, or may be the user's smart phone.

The key fob 200 includes an LFIC (Low Frequency Integrated Circuit) 201, a UWBIC (Ultra Wide Band Integrated Circuit) 220, an LF antenna 251, a UWB antenna 252, an RF antenna 253, and a battery 270. The battery 270 is an example of a main power supply part.

The LFIC 201 is implemented by, for example, an MCU (Micro Controller Unit) including a CPU, a RAM, a ROM, an input/output interface, an internal bus, and so forth. The LFIC 201 has an LF control part 210 and an RF control part 230. The LF control part 210 and the LF antenna 251 constitute an LF receiving part 210A. The LF receiving part 210A is an example of a first receiving part that communicates in the LF band, which is an example of the first frequency band. The RF control part 230 and the RF antenna 253 constitute an RF transmitting part 230A. The RF transmitting part 230A is an example of a second transmitting part that communicates in an RF band, which is an example of a third frequency band. The LF control part 210 and the RF control part 230 control communication in the LF receiving part 210A and the RF transmitting part 230A, respectively. Details of the communication control will be described later with reference to FIG. 3 and FIG. 4.

The UWBIC 220 has a UWB control part 221, a power control part 222, and a load 223. The UWB control part 221 and the UWB antenna 252 constitute a UWB transmitting/receiving part 220A. The UWB transmitting/receiving part 220A is an example of a second transmitting/receiving part that communicates in the UWB band, which is an example of a second frequency band.

The UWB control part 221 controls communication in the UWB transmitting/receiving part 220A. The UWB control part 221 is supplied power from the battery 270, but the details of the power supply path to the battery 270 are omitted here. Details of the communication control will be described later with reference to FIG. 3 and FIG. 4.

The power control part 222 is connected between the battery 270 and the load 223, and controls the amount of power supplied from the battery 270 to the load 223. The power control part 222 is controlled by the UWB control part 221.

The load 223 is a load circuit that consumes power for the UWBIC 220. The load 223 can be any load circuit insofar as it consumes power for the UWBIC 220. For example, the load 223 may be an auxiliary power supply part that is charged by power supplied from the battery 270 to the UWBIC 220, and that supplies power to the UWB control part 221. The auxiliary power supply part is an auxiliary power supply that supplies power to the UWB control part 221, apart from the battery 270, and can be realized, for example, with a buffer capacitor. Note that the load 223 may be provided outside the UWBIC 220. Assume that the UWBIC 220 has the load 223 in this case as well.

After the transmitting/receiving process of distance measurement signals is complete, before the UWB control part 221 transmits data including a flag and the like to the communication device 100 and the RF control part 230 transmits a position determination signal, which will be described later, to the communication device 100, the power control part 222 reduces the amount of power supplied from the battery 270 to the load 223 and waits until the voltage of the battery 270 recovers quickly. Such control of the power control part 222 is performed by the UWB control part 221. Details will be described later with reference to FIG. 3.

The LF antenna 251, the UWB antenna 252, and the RF antenna 253 are antennas optimized for communication in the LF band, the UWB band, and the RF band, respectively.

The battery 270 is a portable power supply source for the key fob 200, and is, for example, a lithium ion battery. The battery 270 may be a storage battery other than a lithium ion battery, but is preferably a rechargeable secondary battery. The battery 270 supplies DC power to the LFIC 201 and the UWBIC 220.

<Summary of Operation of In-Vehicle Authentication System 300>

Of multiple LF transmitting parts 110A, one transmits a command of the LF band. After the command is transmitted, the LF transmitting parts 110A transmit a signal strength measurement signal of the LF band, in order, in time division. That is, the LF transmitting parts 110A transmit signal strength measurement signals of the LF band sequentially. For example, the command is transmitted from an LF transmitting part 110A when the user touches the doorknob on the driver's seat side of the vehicle 10, and the key fob 200 receiving the command is activated.

When the key fob 200 receives the command in the LF receiving part 210A, the key fob 200 activates the UWB transmitting/receiving part 220A, generates an authentication key for a response signal, and transmits a response signal of the UWB band, including the authentication key generated, from the key fob 200.

Also, the signal strength measurement signals are carrier waves that the LF transmitting parts 110A transmit in order, in time division, to determine the position of each key fob 200. Each key fob 200 determines the relative positions between the LF transmitting parts 110A and the key fob 200 based on the signal intensities (RSSI (Received Signal Strength Indicator) values, for example) of the carrier waves received from the respective LF transmitting parts 110A.

One or more key fobs 200 that have received the command send a response signal to the communication device 100, and one key fob 200, whose response signal is received first by the communication device 100, remains on a first-come-first-served basis, and continues the authentication process with the communication device 100.

For example, there are two UWB anchors 120A. The two UWB anchors 120A transmit one distance measurement signal each, to the key fob 200 that remained on a first-come-first-served basis, during the transmission/receiving process of distance measurement signals with the key fob 200.

After the distance measurement signal transmitting/receiving process is complete, the RF receiving part 130A receives a position determination signal of the RF band from the key fob 200. The position determination signal is a signal to represent the relative positions between the LF transmitting parts 110A and the key fob 200 based on the receiving intensities of multiple carrier waves transmitted from the LF transmitting parts 110A to the key fob 200, in the LF receiving part 210A of the key fob 200.

When the communication device 100 receives the position determination signal in the RF receiving part 130A, the communication device 100 determines the position of the key fob 200 based on the relative positions of the LF transmitting parts 110A and the key fob 200 represented by the position determination signal. To be more specific, the communication device 100 determines which LF transmitting part 110A, among the multiple LF transmitting parts 110A, the key fob 200 is located near to.

Also, when the key fob 200 determines that the distance to the communication device 100 estimated from the signal intensities of the carrier waves is greater than or equal to a first predetermined distance, the key fob 200 does not transmit a response signal. The first predetermined distance is an example of a predetermined distance. If the distance between the key fob 200 and the communication device 100 is greater than or equal to the first predetermined distance, the access is ultimately not determined as being an authorized one, and, as soon as it is found out that the distance is far, the number of response signals to be transmitted to the communication device 100 is reduced, so that the overall processing speed of the in-vehicle authentication system 300 is improved. Note that the first predetermined distance is 1 m, for example.

<Mounting Positions in Vehicle>

Figure 2:
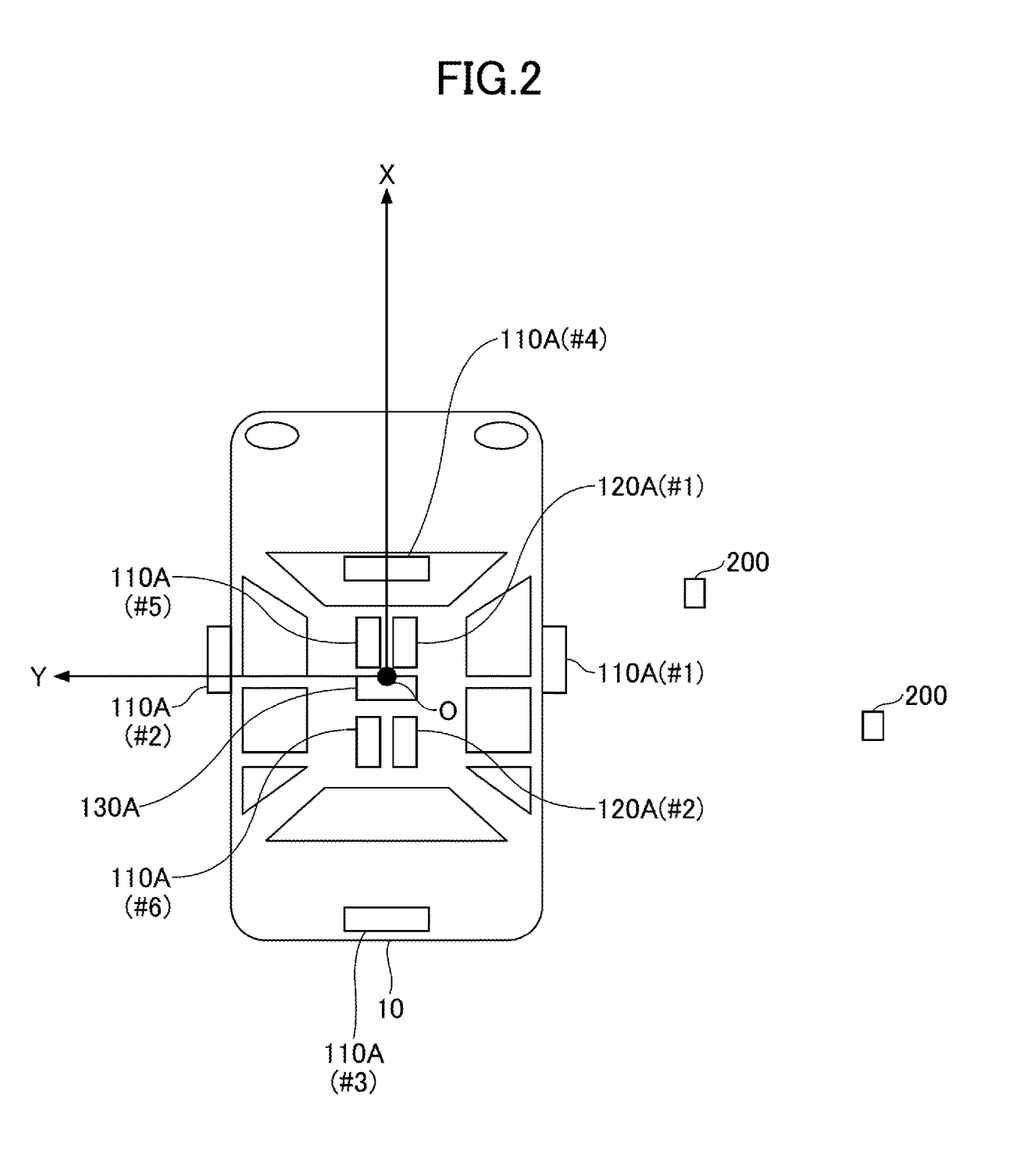
FIG. 2 is a diagram that illustrates examples of mounting positions of an LF transmitting part, a UWB anchor, and an RF receiving part in a vehicle.

FIG. 2 is a diagram that illustrates examples of the mounting positions of the LF transmitting parts 110A, the UWB anchors 120A, and the RF receiving part 130A in the vehicle 10.

FIG. 2 is a diagram that illustrates a vehicle equipped with the communication device 100 of an embodiment. FIG. 2 shows an XY coordinate system, in which origin O is the center of the vehicle 10 in plan view. The +X direction is forward, and is the direction in which the vehicle 10 advances. The +Y direction is the left side with respect to the direction in which the vehicle 10 moves forward. Assume that the vehicle 10 is a right-hand drive vehicle, for example.

For example, FIG. 2 shows the positions of six LF transmitting parts 110A (#1 to #6) and two UWB anchors 120A (#1 and #2) provided in the communication device 100, and the control device 101 is omitted. Here, the six LF transmitting parts 110A are identified by numbers #1 to #6, and the two UWB anchors 120A are identified by numbers #1A and #2A. Also, FIG. 2 shows two key fobs 200 as an example.

LF transmitting part 110A #1 is located near the door on the driver's seat side (the right front door). LF transmitting part 110A #2 is located near the door on the passenger's seat side (the left front door). LF transmitting part 110A #3 is placed at the rear of the vehicle 10, and LF transmitting part 110A #4 is located at the front end of the interior of the vehicle 10. LF transmitting part 110A #5 is placed on the front side of the central part of the interior of the vehicle 10, and LF transmitting part 110A #6 is placed on the rear side of the central part of the interior of the vehicle 10.

UWB anchor 120A #1A is placed next to LF transmitting part 110A #5, and UWB anchor 120A #2A is placed next to LF transmitting part 110A #6. For example, the RF receiving part 130A is located in the center of the vehicle 10, between UWB anchor 120A #1A and LF transmitting part 110A #5, and UWB anchor 120A #2A and LF transmitting part 110A #6.

<Timing Chart>

Figure 3:
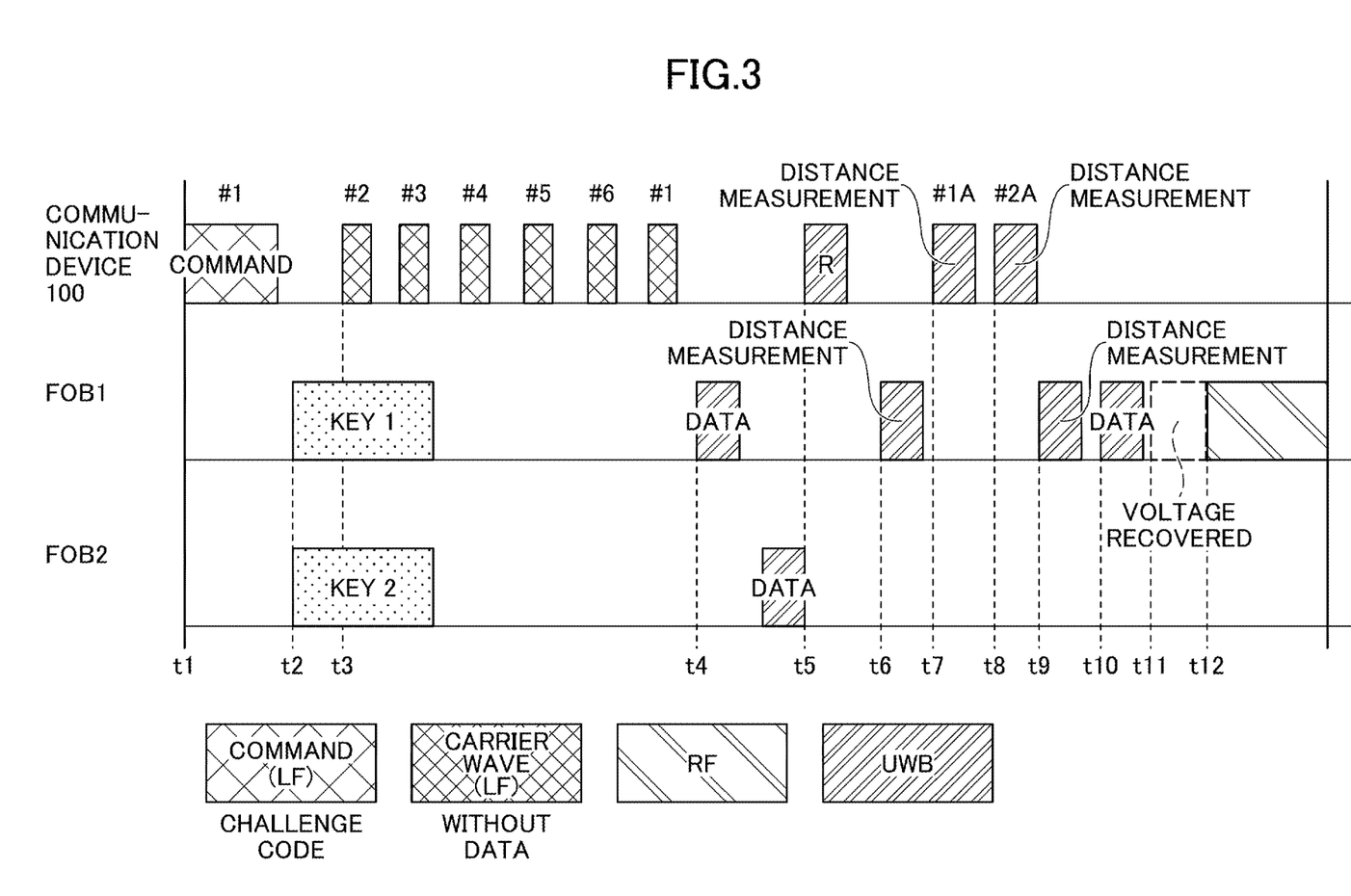
FIG. 3 is a timing chart that illustrates examples of operation of a communication device in an in-vehicle authentication system and two key fobs.

FIG. 3 is a timing chart that illustrates an example of the operation of the communication device 100 and two key fobs 200 (FOB 1 and FOB 2) in the in-vehicle authentication system 300. Here, although an example will be described below in which the in-vehicle authentication system 300 has two key fobs 200 (FOB 1 and FOB 2), the following description applies likewise to cases in which the in-vehicle authentication system 300 has three or more key fobs 200. Here, in order to distinguish between the two key fobs 200, they may be simply referred to as "FOB 1" and "FOB 2."

At time t1, LF transmitting part 110A #1 transmits a command of the LF band, including a challenge code. LF transmitting part 110A #1 transmits the command when the user touches the doorknob on the driver's seat side of the vehicle 10. As a result of this, the LFIC 201 of a key fob 200 that receives the command is activated, and the challenge code is passed on to the UWB control part 221 of the UWB transmitting/receiving part 220A. By this means, the UWBIC 220 is activated. Here, assume that two key fobs 200 (FOB 1 and FOB 2) receive the command.

At time t2, the UWBICs 220 of the FOB 1 and the FOB 2 are activated and generate a key 1 and a key 2, respectively. The key 1 and the key 2 are authentication keys for the response signals with which the key fobs 200 respond to the communication device 100.

At time t3, the communication device 100 transmits carrier waves in the LF band, in time division, in the order of LF transmitting parts 110A #2 to #6, and #1. The LF receiving parts 210A of the FOB 1 and the FOB 2 receive the carrier waves, and measure the receiving intensity (RSSI value) of each carrier wave upon receipt. The carrier waves are transmitted after the command is transmitted.

Here, while the LF receiving parts 210A of the FOB 1 and the FOB 2 are receiving the carrier waves, the UWBICs 220 of the FOB 1 and the FOB 2 generate the key 1 and the key 2, respectively, in parallel, so that the carrier wave receiving process and the key generation process can be executed in parallel, and the processing time can be shortened. Therefore, it is possible to shorten the response time to user operations.

At time t4, the UWBIC 220 of the FOB 1 transmits data including the key 1, to the communication device 100, before the FOB 2 does. At this time, the UWBIC 220 of the FOB 2 has not yet transmitted data including the key 2, and will transmit the data slightly after time t4. Therefore, the FOB 1 continues the authentication process with the communication device 100 on a first-come-first-served basis.

When the communication device 100 determines that the key 1 included in the response signal received from the key fob 200 is valid, at time t5, the communication device 100 transmits a distance measurement request signal to the FOB 1, and the FOB 1 receives the distance measurement request signal R from the communication device 100. The distance measurement request signal R is a signal whereby the communication device 100 requests the FOB 1 to transmit a distance measurement signal including an ID (Identifier).

At time t6, the UWBIC 220 of the FOB 1 transmits a distance measurement signal of the UWB band, including an ID, to the communication device 100, and the communication device 100 receives the distance measurement signal from the FOB 1 at UWB anchor 120A #1A.

At time t7, the communication device 100 transmits the distance measurement signal from UWB anchor 120A #1A to the FOB 1, and the FOB 1 receives the distance measurement signal from the communication device 100. The FOB 1 measures the phase and the like when receiving the distance measurement signal.

At time t8, the communication device 100 transmits a distance measurement signal from UWB anchor 120A #2A to the FOB 1, and the FOB 1 receives the distance measurement signal from the communication device 100. The FOB 1 measures the phase and the like when receiving the distance measurement signal.

At time t9, the UWBIC of the FOB 1 transmits a distance measurement signal including an ID, in the UWB band, to the communication device 100, and the communication device 100 receives the distance measurement signal from the FOB 1. The distance measurement signal that the FOB 1 transmits to the communication device 100 includes data such as the phases measured when the distance measurement signals were received from UWB anchors 120A #1A and #2A. The process from time t6 to t9 is the transmitting/receiving process of distance measurement signals performed between the communication device 100 and the FOB 1.

After the transmitting/receiving process of distance measurement signals is complete, at time t10, the UWBIC 220 of the FOB 1 transmits data to the communication device 100 in the UWB band. This data includes information about the clock of the FOB 1, a flag, and the ID of the FOB 1. The flag indicates that the FOB 1 has properly performed the transmitting/receiving process of distance measurement signals.

Thus, the communication device 100 transmits distance measurement signals (twice: at t7 and t8) and receives distance measurement signals (twice: at t6 and t9), and, the communication device 100 measures the distance between the vehicle and the FOB 1 in TOF format, for example, based on the phase of the distance measurement signals and the like.

At time t11, the UWB control part 221 of the LFIC 201 of the FOB 1 controls the power control part 222 to reduce the amount of power supplied from the battery 270 to the load 223, and waits until the voltage of the battery 270 recovers to a predetermined voltage. The waiting time is from time t11 to time t12, which is a predetermined period of time later, and may be determined in advance as the time it takes for the voltage of the battery 270 to recover to a predetermined voltage after the key fob 200 performs the distance measurement signal transmitting/receiving process, based on experiments or the like.

At time t12, the RF control part 230 of the LFIC 201 of the FOB 1 transmits a position determination signal to the communication device 100 in the RF band. The key fob 200 transmits the position determination signal after transmitting the distance measurement signal. The RF receiving part 130A of the communication device 100 receives the position determination signal of the RF band from the key fob 200.

The position determination signal represents the relative positions between the LF transmitting parts 110A and the key fob 200 based on the receiving intensities of multiple carrier waves transmitted from the LF transmitting parts 110A to the key fob 200, in the LF receiving part 210A of the key fob 200, and includes an authentication key for RF communication.

To be more specific, the relative positions between the LF transmitting parts 110A and the key fob 200 are represented by the distances between the FOB 1 and LF transmission parts 110A #1 to #6, which are calculated based on the signal intensities (RSSI values) of carrier waves received at and after time t3. Using the distances between the FOB 1 and LF transmitting parts 110A #1 to #6, it is possible to determine which of LF transmitting parts 110A #1 to #6 the FOB 1 is closest to. The distances (six distances) between the FOB 1 and LF transmitting parts 110A #1 to #6 indicate which of LF transmitting parts 110A #1 to #6 the FOB 1 is closest to.

The above process is performed by the communication device 100, the FOB 1, and the FOB 2, so that the communication device 100 can determine whether the transmission source of the distance measurement signals is an authorized key fob 200 or an unauthorized relay device impersonating a key fob 200, based on the content of communication with the FOB 1 that remained on a first-come-first-served basis. This is determined by the communication device 100 based on the flag included in the data received at time t10 after the transmitting/receiving process of distance measurement signals is complete, the distance between the communication device 100 and the key fob 200 calculated by the control device 101, and the authentication key for UWB communication included in the position determination signal.

When the communication device 100 determines that the transmission source of the distance measurement signals is an authorized key fob 200, the doors of the vehicle 10 are unlocked.

<Process Executed by Communication Device 100>

Figure 4:
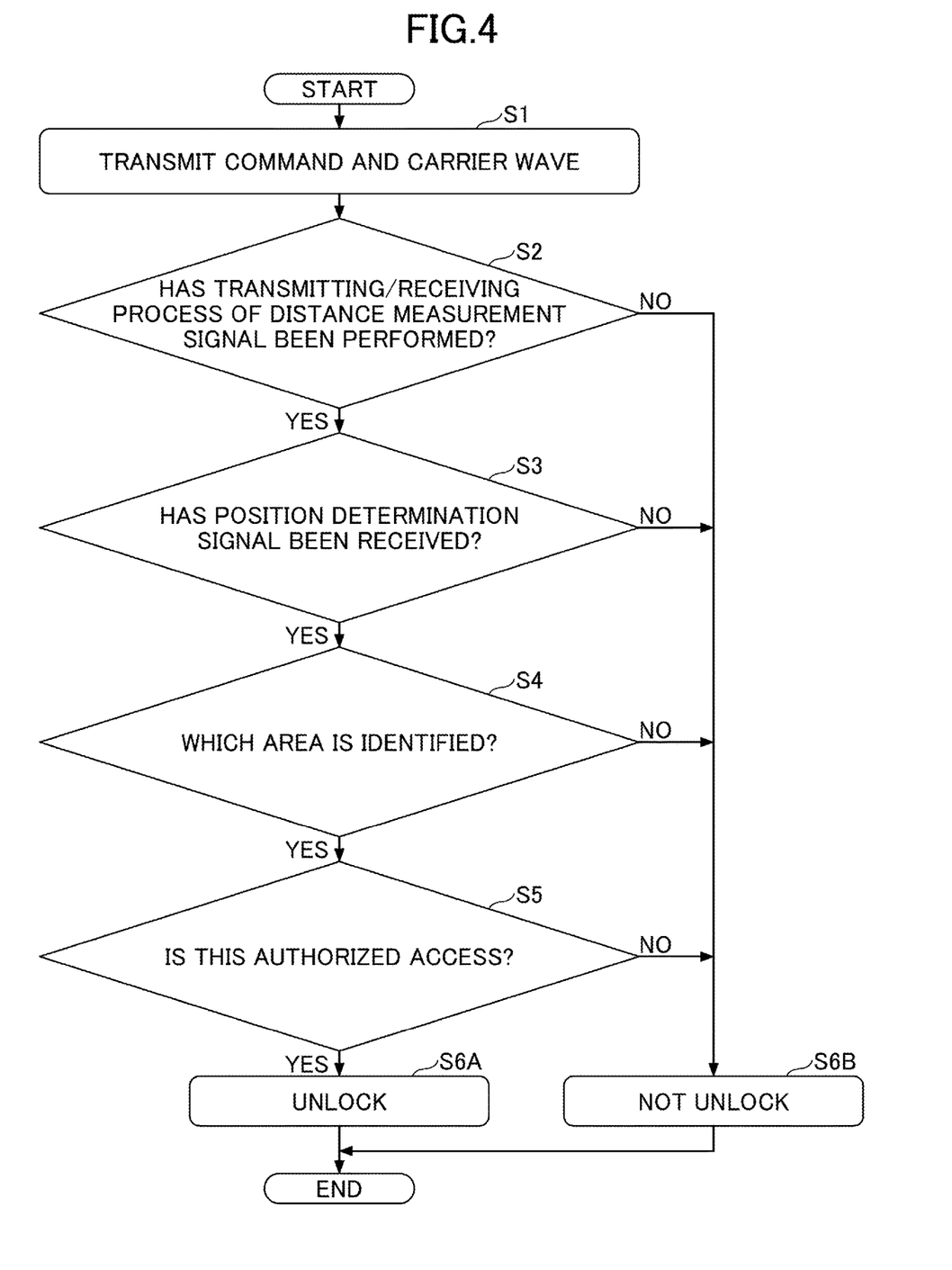
FIG. 4 is a flowchart that illustrates an example of process executed by a control device of a communication device.

FIG. 4 is a flowchart that illustrates an example of process executed by the control device 101 of the communication device 100.

The control device 101 causes LF transmitting part 110A #1 to transmit a command of the LF band, including a challenge code, and causes the six LF transmitting parts 110A to transmit carrier waves in the LF band, in time division, in the order of #2 to #6 and #1 (step S1).

The control device 101 determines whether or not the transmitting/receiving process of distance measurement signals has been performed (step S2).

When the control device 101 determines that the transmitting/receiving process of distance measurement signals has been performed (S2: YES), the control device 101 determines whether or not a position determination signal has been received (step S3).

When the control device 101 determines that a position determination signal has been received (S3: YES), the control device 101 determines in which LF transmitting part 110A's area the key fob 200 is located (step S4). The area of an LF transmitting part 110A is an area where the distance from the LF transmitting part 110A is less than or equal to a second predetermined distance. To determine in which LF transmitting part 110A's area the key fob 200 is located, whether the distance between the key fob 200 and the nearest LF transmitting part 110A, represented by the position determination signal, is less than or equal to the second predetermined distance is determined, to determine whether the key fob 200 is in the area of the nearest LF transmitting part 110A (within the second predetermined distance or less). Note that the second predetermined distance is 2 m, for example.

Therefore, unless the distance between the key fob 200 and the nearest LF transmitting part 110A is less than or equal to the second predetermined distance, it is determined that the key fob 200 does not exist in any LF transmitting part 110A's area. That is, it necessarily follows that the key fob 200 exists outside the areas of all LF transmitting parts 110A. Through the process of step S4, the relative position between the key fob 200 and the nearest LF transmitting part 110A is found out, and whether the key fob 200 is in the areas of multiple LF transmitting parts 110A (within the second predetermined distance or less) is found out.

When the control device 101 determines that the key fob 200 is in the area of an LF transmitting part 110A (S4: YES), the control device 101 determines whether the access is an authorized one (step S5). Whether the access is an authorized one or not is determined by the control device 101 based on: a flag included in data received after the transmitting/receiving process of distance measurement signals is complete; the distance between the communication device 100 and the key fob 200 calculated by the control device 101; and the authentication key for RF communication included in the position determination signal.

As for the flag, it is sufficient to determine whether the value the flag shows indicates that the key fob 200 has performed communication for the transmitting/receiving process of distance measurement signals properly. As for the distance calculated by the control device 101, whether the distance between the communication device 100 and the key fob 200 is less than or equal to the first predetermined distance may be determined. As for the authentication key for UWB communication, whether or not authentication is possible may be determined.

When the control device 101 determines that the access is an authorized one (S5: YES), the control device 101 unlocks the doors and the like (step S6A). The control device 101 finishes the series of processes (END).

On the other hand, when the control device 101 determines in step S5 that the access is not an authorized one (S5: NO), the control device 101 does not unlock the doors or the like (step S6B). The control device 101 finishes the series of processes (END). An "unauthorized access" means an illegitimate access, and a case where a relay attack is performed by using an unauthorized relay device impersonating a key fob 200 may be an example.

Note that, if the control device 101 determines in step S2 that the transmitting/receiving process of distance measurement signals has not been performed (S2: NO), the control device 101 does not unlock the doors or the like (step S6B). The control device 101 finishes the series of processes (END).

Also, if the control device 101 determines in step S3 that the position determination signal has not been received (S3: NO), the control device 101 does not unlock the doors or the like (step S6B). The control device 101 finishes the series of processes (END).

Also, when the control device 101 determines in step S4 that the key fob 200 is not located in any LF transmitting part 110A's area (S4: NO), the control device 101 does not unlock the doors or the like (step S6B). The control device 101 finishes the series of processes (END).

<Process Executed by Key Fob 200>

Figure 5:
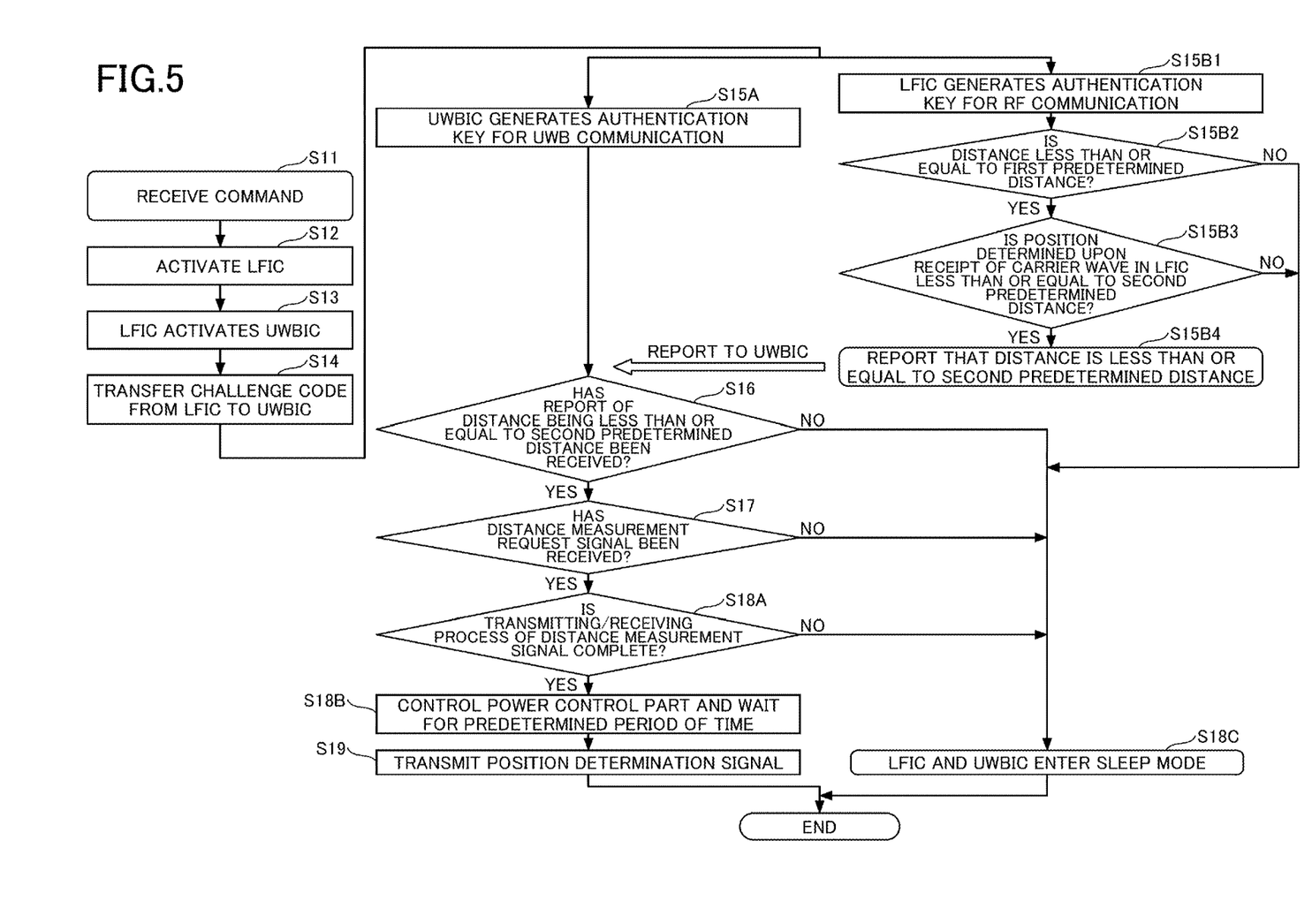
FIG. 5 is a flow chart that illustrates an example of a process executed by a key fob.

FIG. 5 is a flowchart that illustrates an example of process executed by the key fob 200. The process shown in FIG. 5 is executed by the LFIC 201 or the UWBIC 220 of the key fob 200.

The LF receiving part 210A of the key fob 200 receives a command (step S11). As the LF receiving part 210A receives the command, the process of the key fob 200 starts.

Upon receipt of the command, the LFIC 201 is activated (step S12).

The LFIC 201 activates the UWBIC 220 (step S13). The process of step S13 is executed by the LF control part 210 of the LFIC 201.

The LFIC 201 transfers the challenge code included in the received command to the UWBIC 220 (step S14). The process of step S14 is executed by the LF control part 210 of the LFIC 201.

The UWBIC 220 generates authentication keys for UWB communication (corresponding to the keys 1 and 2 in FIG. 3) (step S15A).

The LFIC 201 executes the processes of steps S15B1 to S15B4 in parallel with the process of step S15A executed by the UWBIC 220.

To be more specific, the LFIC 201 generates an authentication key for RF communication (step S15B1). The process of step S15B1 is executed by the RF control part 230 of the LFIC 201.

The LFIC 201 determines whether the distance to the communication device 100, estimated from the signal intensities of carrier waves, is less than or equal to the first predetermined distance (step S15B2). The process of step S15B2 is executed by the RF control part 230 of the LFIC 201.

When the LFIC 201 determines that the distance to the communication device 100, estimated from the signal intensities of carrier waves, is less than or equal to the first predetermined distance (S15B2: YES), the LFIC 201 receives the carrier waves a plurality of times, and determines whether the distance to the LF transmitting part 110A, determined based on the intensities (RSSI values) of the received carrier waves, is less than or equal to the second predetermined distance (step S15B3). The process of step S15B3 is executed by the LF control part 210 of the LFIC 201.

When the LFIC 201 receives the carrier waves multiple times and determines that the distance to the LF transmitting part 110A, determined based on the signal intensities (RSSI values) of the received carrier waves, is less than or equal to a predetermined distance (S15B3: YES), the LFIC 201 reports to the UWBIC 220 that the distance is less than or equal to the second predetermined distance (step S15B4).

The UWBIC 220 determines whether or not there has been a report of the distance being less than or equal to the second predetermined distance (step S16).

The UWBIC 220 determines whether or not a distance measurement request signal has been received (step S17).

When the UWBIC 220 determines that a distance measurement request signal has been received (S17: YES), the UWBIC 220 determines whether or not the transmitting/receiving process of the distance measurement signal is complete (step S18A).

When the UWBIC 220 determines that the transmitting/receiving process of the distance measurement signal is complete (S18A: YES), the UWBIC 220 controls the power control part 222 to wait for a predetermined period of time (step S18B). The waiting time is from time t11 shown in FIG. 3, to time t12, which is a predetermined period of time later.

The RF control part 230 transmits a position determination signal to the communication device 100 in the RF band after the waiting time is over (step S19). The LFIC 201 finishes the series of processes (END).

Note that, in step S15B2, if the LFIC 201 determines that the distance to the communication device 100, estimated from the signal intensities of the carrier waves, is not less than or equal to the first predetermined distance (S15B2: NO), the LFIC 201 and the UWBIC 220 enter sleep mode (step S18C). The sleep mode is an energy saving mode, in which the above-described determination process is not performed. After entering the sleep mode, the LFIC 201 and UWBIC 220 finish the series of processes (END). As a result of this, the key fob 200 does not transmit a response signal.

Also, in step S15B3, if the LFIC 201 receives the carrier waves multiple times and determines that the distance to the LF transmitting part 110A, which is determined based on the signal intensities (RSSI values) of the received carrier waves, is not less than or equal to the second predetermined distance (S15B3: NO), the LFIC 201 and the UWBIC 220 enter sleep mode (step S18C).

Also, in step S16, when the UWBIC 220 determines that there is no report of the distance being less than or equal to the second predetermined distance (S16: NO), the LFIC 201 and UWBIC 220 enter sleep mode (step S18C).

Also, in step S17, when the UWBIC 220 determines that the distance measurement request signal has not been received (S17: NO), the LFIC 201 and the UWBIC 220 enter sleep mode (step S18C).

Also, in step S18, when the UWBIC 220 determines that the transmitting/receiving process of the distance measurement signal is not complete (S18A: NO), the LFIC 201 and the UWBIC 220 enter sleep mode (step S18C).

Effects

As described above, when the key fob 200 receives a command at the LF receiving part 210A, the key fob 200 activates the UWB transmitting/receiving part 220A, generates an authentication key for a response signal, and transmits a response signal of the UWB band, including the generated authentication key, from the key fob 200. Thus, the UWBIC 220 generates an authentication key while the LF receiving part 210A of the key fob 200 is receiving carrier waves, so that the carrier wave receiving process and the key generation process can be executed in parallel, and the processing time can be shortened.

Therefore, it is possible to provide an in-vehicle authentication system 300, an authentication system, and an authentication method, whereby the response time to user operations can be shortened. The authentication system and the authentication method of the embodiment can be implemented in devices or facilities other than the vehicle 10.

Also, after a command is transmitted from an LF transmitting part 110A, the communication device 100 transmits carrier waves of the LF band from the LF transmitting parts 110A, and the key fob 200 acquires the signal intensities upon receipt of the carrier waves in the LF receiving part 210A. Therefore, the relative positions of the key fob 200 with respect to the LF transmitting parts 110A can be determined based on the signal intensities of carrier waves upon receipt, so that it is possible to provide an in-vehicle authentication system 300, an authentication system, and an authentication method, whereby the response time to user operations can be shortened.

Also, when the communication device 100 determines that the authentication key included in a response signal received from the key fob 200 is a valid one, the communication device 100 transmits a distance measurement request signal of the UWB band, which requests transmission of a distance measurement signal including the ID of the key fob 200, from the UWB anchor 120A. When the key fob 200 receives a distance measurement request signal, including the ID of the key fob 200, the key fob 200 transmits a distance measurement signal of the UWB band from the UWB transmitting/receiving part 220A. The communication device 100 calculates the distance with respect to the key fob 200 based on the distance measurement request signal and the distance measurement signal, and determines whether the transmission source of the distance measurement signal is an authorized key fob 200 or an unauthorized relay device impersonating a key fob 200, based on the calculated distance. Therefore, it is possible to provide an in-vehicle authentication system 300, an authentication system, and an authentication method, whereby an unauthorized access such as a relay attack can be effectively prevented, and the response time to user operations can be shortened.

Also, the communication device 100 has an RF receiving part 130A that communicates in the RF band, and the key fob 200 has an RF transmitting part 230A that communicates in the RF band. After transmitting a distance measurement signal from the UWB transmitting/receiving part 220A, the key fob 200 transmits a position determination signal of the RF band from the RF transmitting part 230A. The position determination signal is a signal to represent the relative positions between multiple LF transmitting parts 110A and the key fob 200 based on the receiving intensities of multiple signal strength measurement signals transmitted from the LF transmitting parts 110A, in the LF receiving part 210A. When the communication device 100 receives the position determination signal in the RF receiving part 130A, the communication device 100 determines the position of the key fob 200 based on the relative positions between the LF transmitting parts 110A and the key fob 200, represented by the position determination signal. Therefore, it is possible to provide an in-vehicle authentication system 300, an authentication system, and an authentication method, whereby the communication device 100 can determine the position of the key fob 200 based on the relative positions between multiple LF transmitting parts 110A and the key fob 200, and whereby the response time to user operations can be shortened.

Also, the key fob 200 reduces the supply of power to the UWB transmitting/receiving part 220A for a predetermined period of time after transmitting the distance measurement signal and before transmitting the position determination signal. By this means, the voltage of the battery 270 recovers quickly before the position determination signal is transmitted, which allows the position determination signal to be transmitted quickly. Therefore, it is possible to provide an in-vehicle authentication system 300, an authentication system, and an authentication method, whereby the relative positions of multiple LF transmitting parts 110A and the key fob 200 can be determined quickly, and whereby the response time to user operations can be shortened.

The key fob 200 has a battery 270, and the UWB transmitting/receiving part 220A has a load 223 that serves as an auxiliary power supply part, and a power control part 222 that controls the supply of power from the battery 270 to the auxiliary power supply part (load 223). With the key fob 200, the power control part 222 limits the supply of power from the battery 270 to the auxiliary power supply part (load 223) over a predetermined period of time, thus reducing the supply of power to the UWB transmitting/receiving part 220A over a predetermined period of time. That is, by reducing the charging of the load 223 that serves as an auxiliary power supply part, the voltage of the battery 270 can quickly recover to a predetermined voltage, and the position determination signal can be quickly transmitted to the communication device 100. Therefore, it is possible to provide an in-vehicle authentication system 300, an authentication system, and an authentication method, whereby the relative positions between multiple LF transmitting parts 110A and the key fob 200 can be determined quickly by reducing the charging of the load 223 as an auxiliary power supply part, and whereby the response time to user operations can be shortened.

Also, when the key fob 200 determines that the distance to the communication device 100, estimated from the signal strength of a signal strength measurement signal, is greater than or equal to a first predetermined distance, the key fob 200 does not transmit a response signal. If the distance between the key fob 200 and the communication device 100 is greater than or equal to the first predetermined distance, the access is not ultimately determined as being an authorized one, and, as soon as it is found out that the distance is far, the number of response signals to be transmitted can be reduced, so that the overall processing speed of the in-vehicle authentication system 300 can be improved. It is therefore possible to provide an in-vehicle authentication system 300, an authentication system, and an authentication method, whereby the response time to user operations can be shortened by reducing the number of key fobs 200 that transmit response signals.

Although illustrative embodiments of the authentication system, in-vehicle authentication system, and authentication method of the present disclosure have been described above, the present disclosure is by no means limited to the embodiments specifically disclosed herein, and various modifications and changes can be made without departing from the scope of the accompanying claims.

What is claimed is:

1. An authentication system comprising:
    a first communication device including:
        a first transmitting part configured to communicate in a first frequency band; and
        a first transmitting-and-receiving part configured to communicate in a second frequency band; and
    a second communication device including:
        a first receiving part configured to communicate in the first frequency band; and
        a second transmitting-and-receiving part configured to communicate in the second frequency band,
    wherein the first communication device transmits a command in the first frequency band from the first transmitting part, and
    wherein, upon receipt of the command by the first receiving part, the second communication device activates the second transmitting-and-receiving part, generates an authentication key for a response signal, and transmits the response signal including the generated authentication key in the second frequency band, from the second communication device,
    wherein the first communication device has a plurality of said first transmitting parts, and, following the transmission of the command from any one of the plurality of first transmitting parts, transmits a plurality of signal strength measurement signals in the first frequency band, sequentially, from the plurality of first transmitting parts,
    wherein the second communication device acquires signal intensities upon receipt of the plurality of signal strength measurement signals by the first receiving part,
    wherein, upon determining that the authentication key included in the response signal received from the second communication device is valid, the first communication device transmits a distance measurement request signal from the first transmitting-and-receiving part, in the second frequency band, the distance measurement request signal requesting transmission of a distance measurement signal including an ID of the second communication device,
    wherein, upon receipt of the distance measurement request signal including the ID of the second communication device, the second communication device transmits the distance measurement signal in the second frequency band from the second transmitting-and-receiving part,
    wherein the first communication device calculates a distance to the second communication device based on the distance measurement request signal and the distance measurement signal, and determines, based on the calculated distance, whether a transmission source of the distance measurement signal is the second communication device that is authorized or an unauthorized relay device,
    wherein the first communication device has a second receiving part configured to communicate in a third frequency band,
    wherein the second communication device has a second transmitting part configured to communicate in the third frequency band,
    wherein, following the transmission of the distance measurement signal from the second transmitting-and-receiving part, the second communication device transmits a position determination signal in the third frequency band from the second transmitting part,
    wherein the position determination signal represents relative positions between the plurality of first transmitting parts and the second communication device, based on receiving intensities of the plurality of signal strength measurement signals, transmitted from the plurality of first transmitting parts, at the first receiving part,
    wherein, upon receipt of the position determination signal by the second receiving part, the first communication device determines a position of the second communication device based on the relative positions between the plurality of first transmitting parts and the second communication device, represented by the position determination signal, and
    wherein, following the transmission of the distance measurement signal, and prior to the transmission of the position determination signal, the second communication device reduces supply of power to the second transmitting-and-receiving part for a predetermined period of time.

2. The authentication system according to claim 1,
wherein the second communication device has a main power supply part,
wherein the second transmitting-and-receiving part has:
an auxiliary power supply part; and
a power control part configured to control supply of power from the main power supply part to the auxiliary power supply part, and
wherein the second communication device reduces supply of power to the second transmitting-and-receiving part for the predetermined period of time, by having the power control part reduce the supply of power from the main power supply part to the auxiliary power supply part for the predetermined period of time.

3. The authentication system according to claim 1, wherein, upon determining that the distance to the first communication device, estimated from the signal intensities of the plurality of signal strength measurement signals, is greater than or equal to a predetermined distance, the second communication device does not transmit the response signal.

4. An in-vehicle authentication system comprising:
in-vehicle equipment including:
a first transmitting part configured to communicate in a first frequency band; and
a first transmitting-and-receiving part configured to communicate in a second frequency band;
a mobile device including:
a first receiving part configured to communicate in the first frequency band; and
a second transmitting-and-receiving part configured to communicate in the second frequency band,
wherein the in-vehicle equipment transmits a command in the first frequency band from the first transmitting part, and
wherein, upon receipt of the command by the first receiving part, the mobile device activates the second transmitting-and-receiving part, generates an authentication key for a response signal, and transmits the response signal including the generated authentication key in the second frequency band, from the mobile device,
wherein the in-vehicle equipment has a plurality of said first transmitting parts, and, following the transmission of the command from any one of the plurality of first transmitting parts, transmits a plurality of signal strength measurement signals in the first frequency band, sequentially, from the plurality of first transmitting parts,
wherein the mobile device acquires signal intensities upon receipt of the plurality of signal strength measurement signals by the first receiving part,
wherein, upon determining that the authentication key included in the response signal received from the mobile device is valid, the in-vehicle equipment transmits a distance measurement request signal from the first transmitting-and-receiving part, in the second frequency band, the distance measurement request signal requesting transmission of a distance measurement signal including an ID of the mobile device,
wherein, upon receipt of the distance measurement request signal including the ID of the mobile device, the mobile device transmits the distance measurement signal in the second frequency band from the second transmitting-and-receiving part,
wherein the in-vehicle equipment calculates a distance to the mobile device based on the distance measurement request signal and the distance measurement signal, and determines, based on the calculated distance, whether a transmission source of the distance measurement signal is the mobile device that is authorized or an unauthorized relay device,
wherein the in-vehicle equipment has a second receiving part configured to communicate in a third frequency band,
wherein the mobile device has a second transmitting part configured to communicate in the third frequency band,
wherein, following the transmission of the distance measurement signal from the second transmitting-and-receiving part, the mobile device transmits a position determination signal in the third frequency band from the second transmitting part,
wherein the position determination signal represents relative positions between the plurality of first transmitting parts and the mobile device, based on receiving intensities of the plurality of signal strength measurement signals, transmitted from the plurality of first transmitting parts, at the first receiving part,
wherein, upon receipt of the position determination signal by the second receiving part, the in-vehicle equipment determines a position of the mobile device based on the relative positions between the plurality of first transmitting parts and the mobile device, represented by the position determination signal, and
wherein, following the transmission of the distance measurement signal, and prior to the transmission of the position determination signal, the mobile device reduces supply of power to the second transmitting-and-receiving part for a predetermined period of time.

5. An authentication method executed in an authentication system including:
a first communication device with:
a first transmitting part configured to communicate in a first frequency band; and
a first transmitting-and-receiving part configured to communicate in a second frequency band; and
a second communication device with:
a first receiving part configured to communicate in the first frequency band; and
a second transmitting-and-receiving part configured to communicate in the second frequency band,
wherein the first communication device transmits a command in the first frequency band from the first transmitting part,
wherein, upon receipt of the command by the first receiving part, the second communication device activates the second transmitting-and-receiving part, generates an authentication key for a response signal, and transmits the response signal including the generated authentication key in the second frequency band, from the second communication device,
wherein the first communication device has a plurality of said first transmitting parts, and, following the transmission of the command from any one of the plurality of first transmitting parts, transmits a plurality of signal strength measurement signals in the first frequency band, sequentially, from the plurality of first transmitting parts,
wherein the second communication device acquires signal intensities upon receipt of the plurality of signal strength measurement signals in the first receiving part,
wherein, upon determining that the authentication key included in the response signal received from the second communication device is valid, the first communication device transmits a distance measurement request signal from the first transmitting-and-receiving part, in the second frequency band, the distance measurement request signal requesting transmission of a distance measurement signal including an ID of the second communication device, wherein, upon receipt of the distance measurement request signal including the ID of the second communication device, the second communication device transmits the distance measurement signal in the second frequency band from the second transmitting-and-receiving part, wherein the first communication device calculates a distance to the second communication device based on the distance measurement request signal and the distance measurement signal, and determines, based on the calculated distance, whether a transmission source of the distance measurement signal is the second communication device that is authorized or an unauthorized relay device, wherein the first communication device has a second receiving part configured to communicate in a third frequency band, wherein the second communication device has a second transmitting part configured to communicate in the third frequency band, wherein, following the transmission of the distance measurement signal from the second transmitting-and-receiving part, the second communication device transmits a position determination signal in the third frequency band from the second transmitting part, wherein the position determination signal represents relative positions between the plurality of first transmitting parts and the second communication device, based on receiving intensities of the plurality of signal strength measurement signals, transmitted from the plurality of first transmitting parts, at the first receiving part, wherein, upon receipt of the position determination signal by the second receiving part, the first communication device determines a position of the second communication device based on the relative positions between the plurality of first transmitting parts and the second communication device, represented by the position determination signal, and wherein, following the transmission of the distance measurement signal, and prior to the transmission of the position determination signal, the second communication device reduces supply of power to the second transmitting-and-receiving part for a predetermined period of time.

6. The authentication method according to claim 5,
wherein the second communication device has a main power supply part,
wherein the second transmitting-and-receiving part has:
  an auxiliary power supply part; and
  a power control part configured to control supply of power from the main power supply part to the auxiliary power supply part, and
wherein the second communication device reduces supply of power to the second transmitting-and-receiving part for the predetermined period of time, by having the power control part reduce the supply of power from the main power supply part to the auxiliary power supply part for the predetermined period of time.

7. The authentication method according to claim 5, wherein, upon determining that the distance to the first communication device, estimated from the signal intensities of the plurality of signal strength measurement signals, is greater than or equal to a predetermined distance, the second communication device does not transmit the response signal.

\* \* \* \* \*